United States Patent
Jezewski

(10) Patent No.: US 10,083,245 B1
(45) Date of Patent: Sep. 25, 2018

(54) PROVIDING SECURE STORAGE OF CONTENT AND CONTROLLING CONTENT USAGE BY SOCIAL MEDIA APPLICATIONS

(71) Applicant: Capital One Services, LLC, McLean, VA (US)

(72) Inventor: Joni Bridget Jezewski, Fairfax, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/896,938

(22) Filed: Feb. 14, 2018

(51) Int. Cl.
*G06F 15/173* (2006.01)
*G06F 17/30* (2006.01)
*H04L 29/06* (2006.01)
*H04L 29/08* (2006.01)
*G06Q 50/00* (2012.01)

(52) U.S. Cl.
CPC ......... *G06F 17/3089* (2013.01); *H04L 63/08* (2013.01); *H04L 67/306* (2013.01); *G06Q 50/01* (2013.01)

(58) Field of Classification Search
CPC .... G06F 17/3089; H04L 67/306; G06Q 50/01
USPC ....................................................... 709/217
See application file for complete search history.

(56) References Cited

U.S. PATENT DOCUMENTS

| | | | | |
|---|---|---|---|---|
| 9,537,811 B2 * | 1/2017 | Allen | ...................... | H04L 51/10 |
| 9,693,191 B2 * | 6/2017 | Sehn | ...................... | H04W 4/029 |
| 9,825,898 B2 * | 11/2017 | Sehn | ...................... | H04L 51/26 |
| 9,843,720 B1 * | 12/2017 | Ebsen | ...................... | H04W 4/029 |
| 9,860,744 B1 * | 1/2018 | Cheng | ...................... | H04W 12/02 |
| 9,911,126 B2 * | 3/2018 | Morten | ...................... | G06Q 30/02 |
| 2005/0159832 A1 * | 7/2005 | Umeo | ...................... | G08C 19/00 700/94 |
| 2009/0300502 A1 * | 12/2009 | Johnson | ...................... | G06Q 10/00 715/733 |
| 2014/0359602 A1 * | 12/2014 | Sawaya | ...................... | G06F 8/61 717/176 |
| 2015/0088622 A1 * | 3/2015 | Ganschow | ...................... | G06Q 50/01 705/14.5 |
| 2016/0247188 A1 * | 8/2016 | Zhou | ...................... | G06F 17/30867 |

OTHER PUBLICATIONS

Marcon et al. "Regaining Control over Personal Data Sharing", 6 pages.

* cited by examiner

*Primary Examiner* — Tauqir Hussain
(74) *Attorney, Agent, or Firm* — Harrity & Harrity, LLP

(57) ABSTRACT

A device receives, based on installation of a content application on a client device, credentials of a user of the client device, and information identifying a social media application granted access to content associated with the user. The device receives the content from the client device. The device generates a link for the content, and stores the credentials, the content, the link, and the information identifying the social media application. The device receives information indicating that the content is be provided in a post associated with the social media application, and provides the link to the post. The device receives a selection of the link from another client device associated with another user that is viewing the post via the social media application, and provides the content, in a secure format, to the other client device based on the selection of the link.

20 Claims, 13 Drawing Sheets

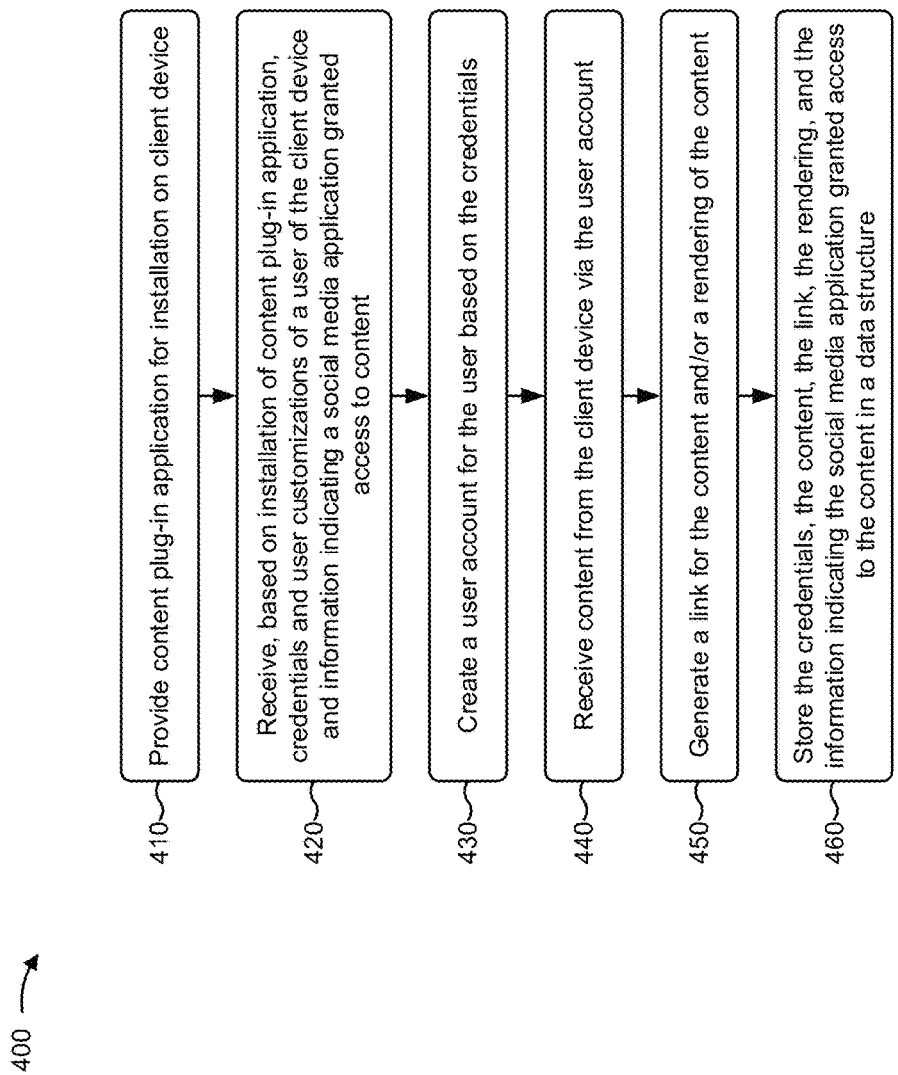

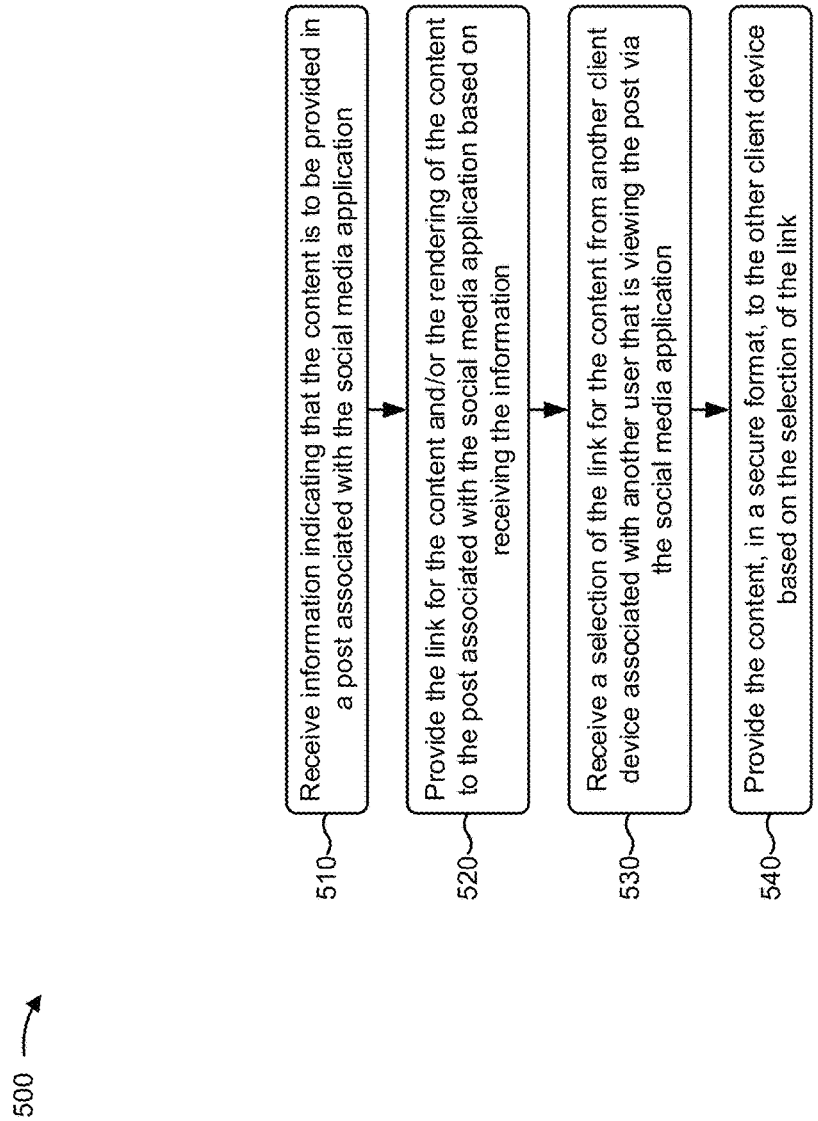

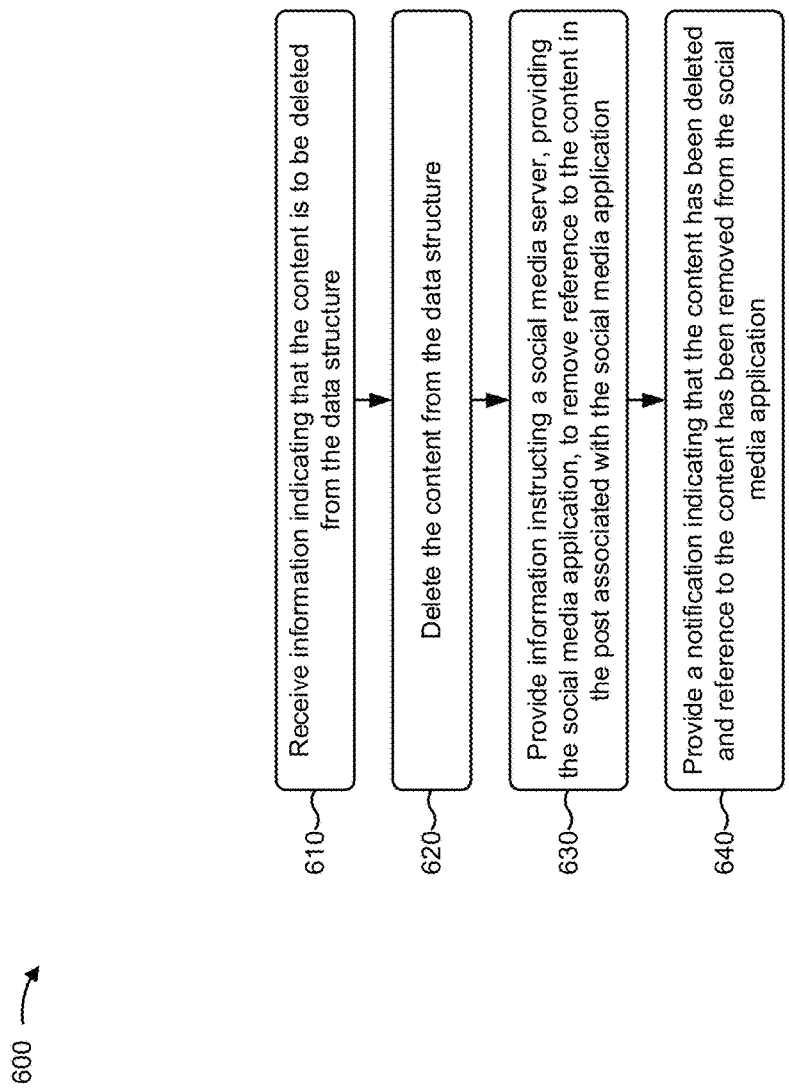

PROVIDING SECURE STORAGE OF CONTENT AND CONTROLLING CONTENT USAGE BY SOCIAL MEDIA APPLICATIONS

BACKGROUND

Users of social media applications utilize the applications for a variety of purposes, such as sharing content with friends and family, providing updates on aspects of their social lives, posting blogs about a variety of topics, marketing a product or a service, and/or the like. Thus, the social media applications provide a powerful tool in the exchange of content among users.

SUMMARY

According to some implementations, a device may include one or more memories, and one or more processors, communicatively coupled to the one or more memories, to provide a content application for installation on a client device, and may receive, based on installation of the content application on the client device, credentials of a user of the client device, and information identifying a social media application granted access to content associated with the user. The one or more processors may create a user account for the user based on the credentials of the user, and may receive the content from the client device and via the user account. The one or more processors may generate a link for the content, and may store the credentials, the content, the link, and the information identifying the social media application in the one or more memories. The one or more processors may receive information indicating that the content is be provided in a post associated with the social media application, and may provide the link for the content to the post associated with the social media application. The device may receive a selection of the link for the content from another client device associated with another user that is viewing the post via the social media application, and may provide the content, in a secure format, to the other client device based on the selection of the link.

According to some implementations, a method may include receiving, by a device, content from a client device associated with a user, a social media application being granted access to the content based on a permission of the user, and generating, by the device, a link for the content. The method may include storing, by the device, the content, the link, and information identifying the social media application in a data structure, and receiving, by the device, information indicating that the content is be provided in a post associated with the social media application. The method may include providing, by the device, the link for the content to a social media server device associated with the social media application, where the social media server device is to provide the link in the post associated with the social media application. The method may include receiving, by the device, a selection of the link for the content from another client device associated with another user that is viewing the post via the social media application, and providing, by the device, the content, in a secure format, to the other client device based on the selection of the link.

According to some implementations, a non-transitory computer-readable medium may store instructions that include one or more instructions that, when executed by one or more processors of a device, cause the one or more processors to provide a content application for installation on a client device, and receive, based on installation of the content application on the client device, information identifying a social media application granted access to content associated with the client device. The one or more instructions may cause the one or more processors to receive the content from the client device, and generate one of a link for the content or a rendering of the content. The one or more instructions may cause the one or more processors to store the content, the link or the rendering, and the information identifying the social media application in a data structure, and receive information indicating that the content is be provided in a post associated with the social media application. The one or more instructions may cause the one or more processors to provide the one of the link for the content or the rendering of the content to the post associated with the social media application, and receive, when the link is provided to the post, a selection of the link for the content from another client device that is displaying the post via the social media application. The one or more instructions may cause the one or more processors to provide the content, in a secure format, to the other client device based on the selection of the link.

BRIEF DESCRIPTION OF THE DRAWINGS

FIG. 4 is a flow chart of an example process for securely storing content that may be utilized with social media applications;

FIG. 5 is a flow chart of an example process for securely sharing stored content with a social media application; and FIG. 6 is a flow chart of an example process for deleting content that was previously shared with a social media application.

DETAILED DESCRIPTION

The following detailed description of example implementations refers to the accompanying drawings. The same reference numbers in different drawings may identify the same or similar elements.

Sharing content on social media applications can be a wonderful experience for users, such as family and friends. However, social media applications provide insufficient control over utilization of content by other users, and many users of social media applications feel like they have no control over the content shared on the social media applications. For example, users of some social media applications are unable to edit their posts, and their posts are frequently copied by other users without any accountability. Furthermore, users of many social media applications have to worry about whether they own the content they post on the social media applications, and whether they have a right to utilize the posted content as they wish. Finally, a user can delete content from a social media application, but deleting the content will not completely remove the content from the social media application if the content has been shared with other users and the other users have not deleted the content.

Some implementations described herein may provide a content platform that securely stores content and controls usage of the content by social media applications. For example, the content platform may enable a user to store content in storage associated with the content platform, instead of directly sharing the content with a social media application. The content platform may generate a link to the content in the storage, and may generate a rendering of the content that simulates the content. If the user wishes to share the content via a post on a social media application, the content platform may provide the link and/or the rendering to the post on the social media application, instead of the content (e.g., so that content may not be copied). Thus, the content platform may securely store the content and may control usage of the content by the social media application. In addition, if the user wishes to delete the content, the content platform may delete the content from the storage, and may cause the social media application to remove the link and/or the rendering from the post on the social media application.

Figure 1A:
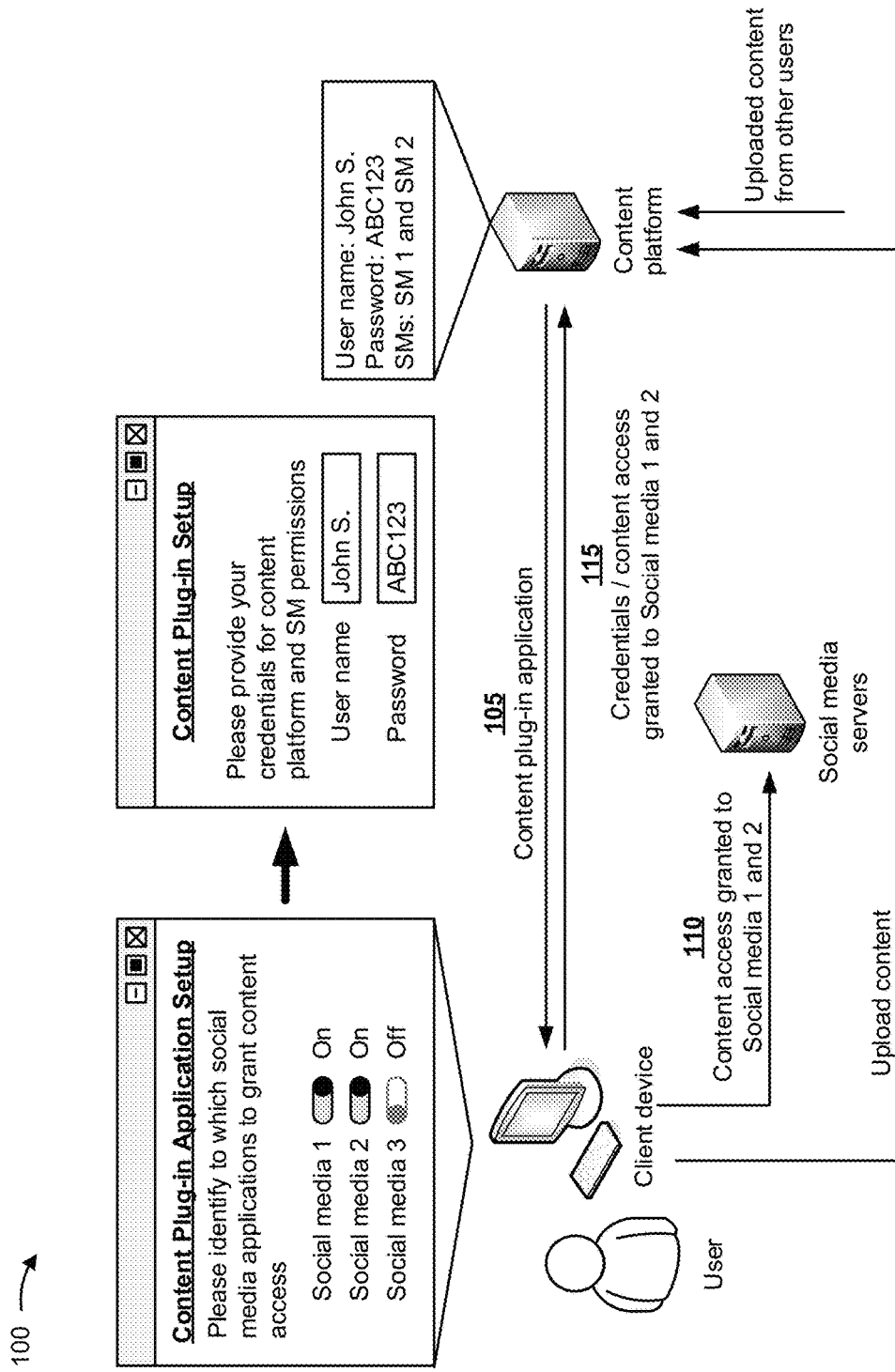
FIGS. 1A-1H are diagrams of an overview of an example implementation described herein.

FIGS. 1A-1H are diagrams of an overview of an example implementation 100 described herein. As shown in FIG. 1A, a user may be associated with a client device, social media servers, and a content platform. Assume that the user wishes to utilize the client device to download a content plug-in application provided by the content platform. In some implementations, the content plug-in application may include an application that enables the client device to securely store content with the content platform, and to control usage of the content by the social media servers (e.g., social media applications provided by the social media servers).

In some implementations, the content may include an information that a user may wish to maintain private or confidential, such as social media content (e.g., messages, images, videos, emails, blogs, and/or the like), biometric content shared with health applications, application usage statistics, financial transaction information, search engine usage and history, credentials, and/or the like.

As further shown in FIG. 1A, and by reference number 105, the user may utilize the client device to download the content plug-in application from the content platform, and to install and setup the content plug-in application. As further shown in FIG. 1A, once the client device installs the content plug-in application, the user may utilize the client device to setup the content plug-in application. For example, the content plug-in application may request that the user identify to which social media applications to grant content access. The user may utilize the client device to indicate that the user wishes to grant content access to social media applications 1 and 2, but not to social media application 3. As further shown in FIG. 1A, and by reference number 110, the client device may provide, to the social media servers, information indicating that the user granted content access to social media applications 1 and 2, but not to social media application 3. The information indicating that the user granted content access to social media applications 1 and 2 may be used by the social media servers to interact with the content platform, as described elsewhere herein.

In some implementations, the content plug-in application may detect a content submission by the client device, and may automatically redirect the client device to the content platform. In such implementations, the content platform may enable the client device to upload content directly to the content platform, without interacting with the social media servers. The content platform may communicate with the social media servers regarding the content. In such implementations, the content plug-in application may not require preregistration.

In some implementations, the content plug-in application and the content platform may be utilized with any application where a user wishes to protect content. For example, the content plug-in application and the content platform may be utilized with an application that collects health information associated with the user, a financial institution application that receives user financial information (e.g., images of checks), and/or the like.

As further shown in FIG. 1A, the content plug-in application may request that the user provide credentials (e.g., a user name and a password) for accessing the content platform and for granting permissions for content access to the social media applications. For example, the user may provide a user name (e.g., John S.) and a password (e.g., ABC123) for the credentials. As further shown in FIG. 1A, and by reference number 115, the user may cause the client device to provide, to the content platform, the credentials and the information indicating that the user granted content access to social media applications 1 and 2, but not to social media application 3. The content platform may receive the credentials and the information indicating that the user granted content access to social media applications 1 and 2, but not to social media application 3. In some implementations, the content platform may create a user account for the user based on the credentials. In some implementations, the content platform may store the user name and the password as authentication information for the user to access the content platform. In some implementations, the content platform may utilize the authentication information in order to determine whether the user is authorized to access the content plug-in application. In some implementations, the user may customize other aspects of the content plug-in application, such as permissions granted to social media applications, control over content, and/or the like, as described elsewhere herein.

As further shown in FIG. 1A, the user may cause the client device to upload content to the content platform, and the content platform may receive the uploaded content from the client device. As further shown, the content platform may receive uploaded content from other users of the content platform. In some implementations, the content uploaded by the client device and the content uploaded by the other users may include images, videos, text, audio files, and/or the like.

Figure 1B:
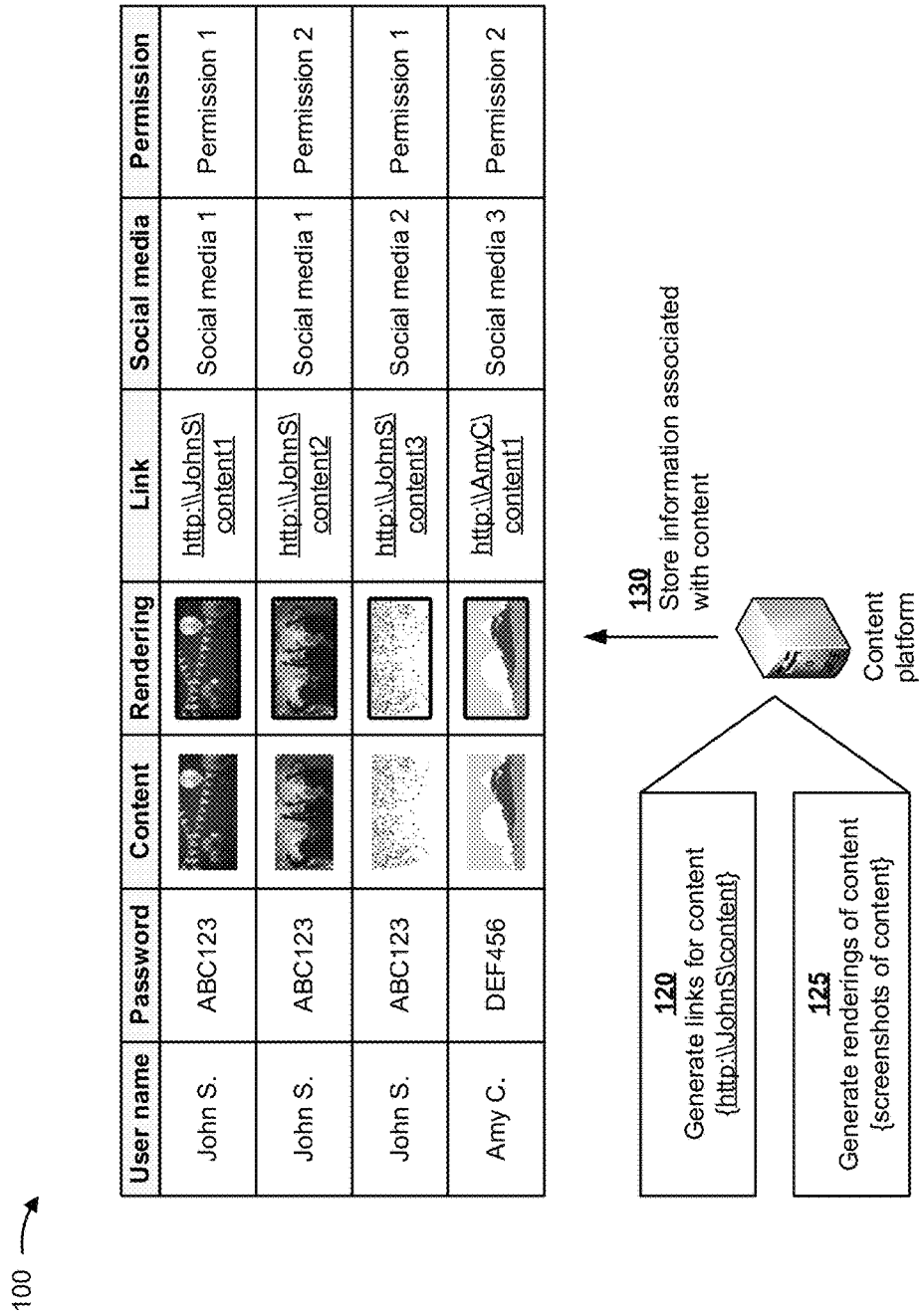

As shown in FIG. 1B, and by reference number 120, the content platform may generate links for the content uploaded to the content platform. In some implementations, the links may include information identifying locations of where the content is stored within the content platform (e.g., within a data structure associated with the content platform). For example, if the user (e.g., John S.) uploaded content, the content platform may generate a link (e.g., http:\\JohnS\content) identifying the location of where the content is stored within the content platform, a metadata tag identifying the content, and/or the like.

As further shown in FIG. 1B, and by reference number 125, the content platform may generate renderings for the content uploaded to the content platform. In some implementations, the content platform may generate the renderings for the content by altering the content in various ways, such as by adjusting sizes, shapes, colors, shadings, formats, and/or the like of the content. In some implementations, the renderings may include screenshots (or screen captures) of the content uploaded to the content platform.

As further shown in FIG. 1B, and by reference number 130, the content platform may store information associated with the content in a data structure, such as a database, a table, a linked list, and/or the like associated with the content platform. In some implementations, the information associated with the content may include a user name (e.g., John S.

or Amy C.) and a password (e.g., ABC123 or DEF456) associated with a user of the content platform, the content uploaded to the content platform, the renderings of the content, the links for the content (e.g., http:\\JohnS\content1 or http:\\AmyC\content1), information indicating the social media applications granted access to the content, information indicating types of permissions granted to the social media applications (e.g., access to only the link, access to only the rendering, access to the link and the rendering, and/or the like), and/or the like.

In some implementations, the content platform may securely store the information associated with the content by encrypting the information associated with the content using an encryption technology. For example, the information associated with the content may be securely stored using symmetric-key (or single-key) encryption technology. Using symmetric-key encryption technology, a single key, which is shared by the content platform and the user, may be used to encrypt and decrypt the information associated with the content. Example symmetric-key technologies may include the advanced encryption standard (AES), the data encryption standard (DES), the triple DES (3DES), Serpent, Twofish, blowfish, CASTS, RC4, the international data encryption algorithm (IDEA), and/or the like.

In some implementations, the information associated with the content may be securely stored using asymmetric-key (or public-key-private-key) encryption technology. Using asymmetric-key encryption technology, information may be encrypted with a private key, and decrypted with a public key, to verify that the information was encrypted using the corresponding private key. Example asymmetric-key encryption technologies may include digital signal algorithm (DSA), Rivest-Shamir-Adleman (RSA), Diffie-Hellman key exchange, key serialization, asymmetric utilities, X25519 key exchange, and/or the like.

In some implementations, the information associated with the content may be securely stored by applying a cryptographic hash function to the information. The cryptographic hash function may be used to verify integrity of files and/or messages, verify passwords, and/or the like. Example cryptographic hash functions may include secure hash algorithm 1 (SHA-1), secure hash algorithm 2 (SHA-2), secure hash algorithm 3 (SHA-3), message digest 5 (MD5), BLAKE2, and/or the like.

In some implementations, the content platform may only encrypt the content that is uploaded to the content platform. In some implementations, the content platform may back up the information associated with the content. Backing up of the information associated with the content may be performed manually, automatically, on a regular basis, and/or according to a schedule.

In some implementations, the information associated with the content may be securely stored by controlling the sharing of the information associated with the content with social media applications. For example, a user may set permissions to determine what information associated with the content may be accessed by a social media application and/or when the information associated with the content may be accessed by the social media application. The permission may be based on levels of access, where information associated with the content may be accessed by all social media applications, by some social media applications, or by no social media applications.

In some implementations, the information associated with the content may be password-protected to prevent access to the information by social media applications unless a particular password is provided. Alternatively, or additionally, some implementations may utilize certificate-based encryption to protect the information associated with the content. In some implementations, the certificate-based encryption may apply a combination of symmetric-key encryption and asymmetric-key encryption.

In some implementations, the content platform may utilize steganography to hide the information associated with the content inside other data. For example, the content platform may utilize steganography to hide the information inside of audio files, video files, image files, document files, and/or the like.

In some implementations, the content platform may protect the information associated with the content while the information associated with the content is in transit from the content platform to a social media application. For example, the information associated with the content may use Internet protocol security (IPsec) to encrypt the information while the information associated with the content is in transit.

Figure 1C:
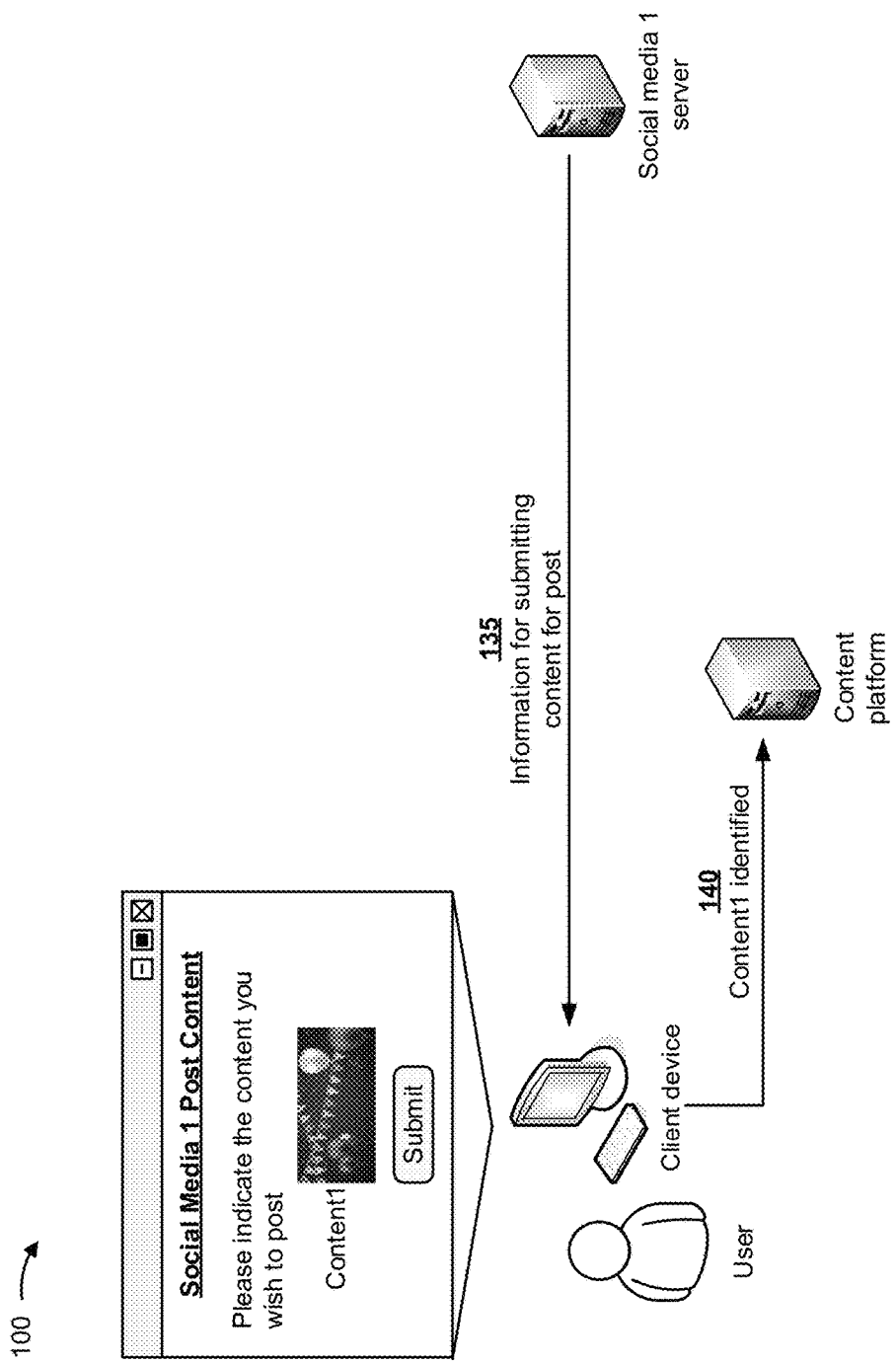

As shown in FIG. 1C, assume that the user utilizes the client device to access a social media application (e.g., social media application 1) hosted by a social media server (e.g., social media 1 server). Further assume that the user wishes to post (e.g., share) content on the social media application. As further shown in FIG. 1C, and by reference number 135, the social media server may provide, to the client device, information for submitting content for the post, and the client device may display the information for submitting content for the post to the user. For example, the client device may display a user interface requesting the user to indicate the content the user wishes for the post. The user may indicate the content for the post (e.g., Content1) via the user interface.

As further shown in FIG. 1C, and by reference number 140, when the user indicates the content for the post, the client device may provide, to the content platform, information indicating the content for the post. The content platform may receive the information indicating the content for the post. In some implementations, the content platform may search the data structure for the content for the post, and may retrieve the link for the content and/or the rendering of the content from the data structure based on the search for the content.

In some implementations, the content platform may store the content for the post, rather than the social media server, so that the content may be protected from being copied when posted by the social media server. In such implementations, the content platform provides the link for the content and/or the rendering of the content, rather than the actual content, to the social media server, so that the content is protected. In contrast, if the actual content was provided to the social media server (e.g., as is typically the case), the actual content may be copied.

Figure 1D:
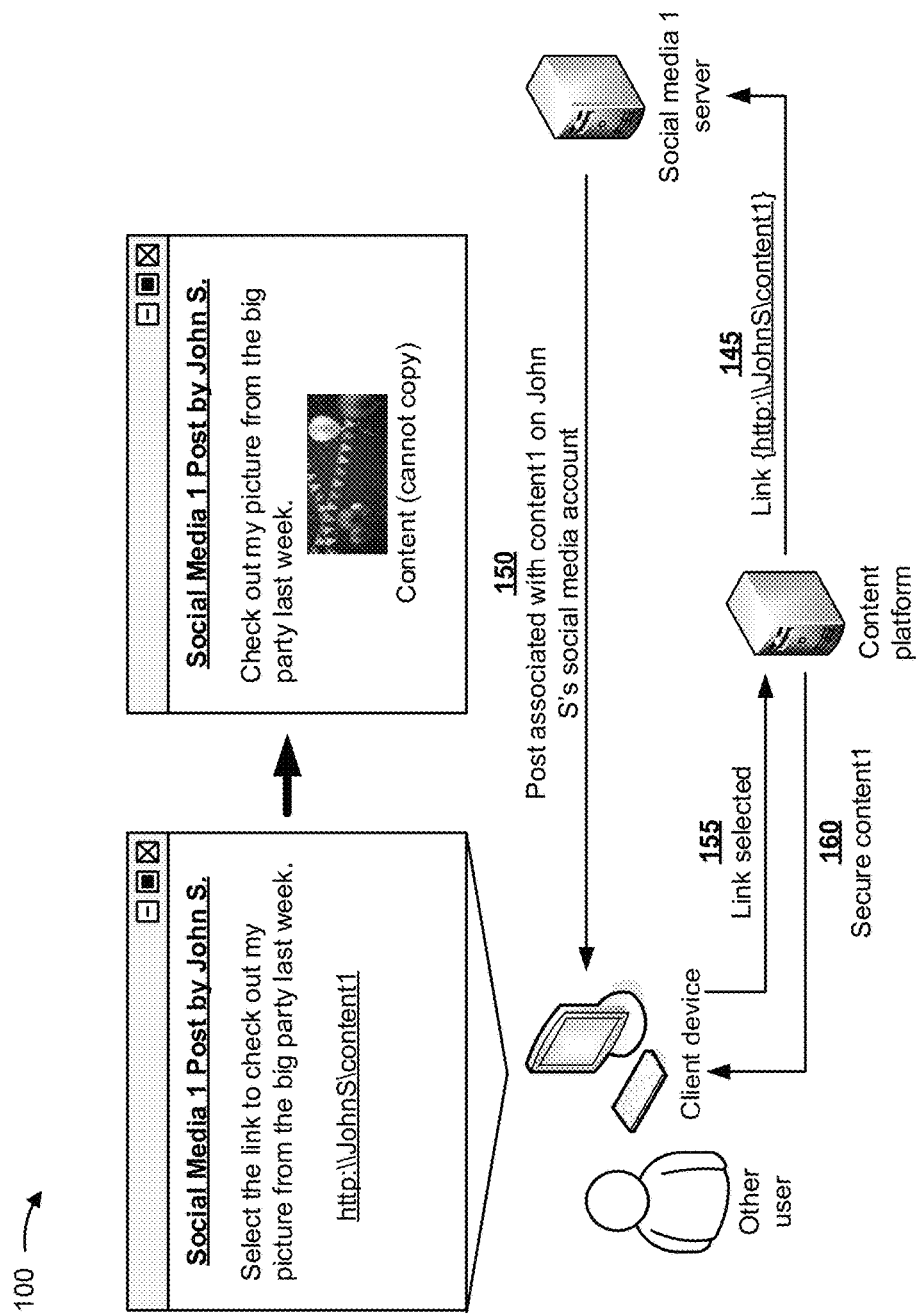

As shown in FIG. 1D, and by reference number 145, the content platform may provide the link for the content (e.g., http:\\JohnS\content1 which corresponds to Content1) to the social media server, rather than the actual content. In some implementations, the social media server may generate the post for the user (e.g., John S.) based on the information submitted for the post by the user, and may provide the link for the content within the post. As further shown in FIG. 1D, and by reference number 150, the social media server may publish the post associated with the content on the user's (e.g., John S.) social media account, and the post may be seen by another user associated with another client device. In some implementations, the social media server may publish the post, with the link for the content, on the user's social media account. For example, the social media server may publish the post via a user interface that indicates "Select the link to check out my picture from the big party last week" and provides the link for the content (e.g., http:\\JohnS\content1).

Assume that another user ("other user") utilizes the other client device to select the link for the content. As further shown in FIG. 1D, and by reference number 155, when the other user selects the link, the other client device may provide, to the content platform, an indication of the selection of the link for the content. In some implementations, the content platform may receive the indication of the selection of the link for the content, and may search the data structure for the link. In such implementations, the content platform may locate the link in the data structure based on the search, and may identify the content associated with the link in the data structure.

As further shown in FIG. 1D, and by reference number 160, the content platform may provide the content (e.g., Content1), in a secure format, to the other client device. In some implementations, the secure format may include a format that prevents the other user from copying the content, re-posting the content, saving the content, changing the content, and/or the like. For example, the secure format may include a format that subjects the content to rights management, such as digital rights management access control technologies, information rights management access control technologies, and/or the like. As further shown in FIG. 1D, the other client device may receive the secure content, and may display the post with the secure content (e.g., rather than the link) to the other user. In some implementations, the other user will be unable to copy the secure content, re-post the secure content, save the secure content, change the secure content, and/or the like.

Figure 1E:
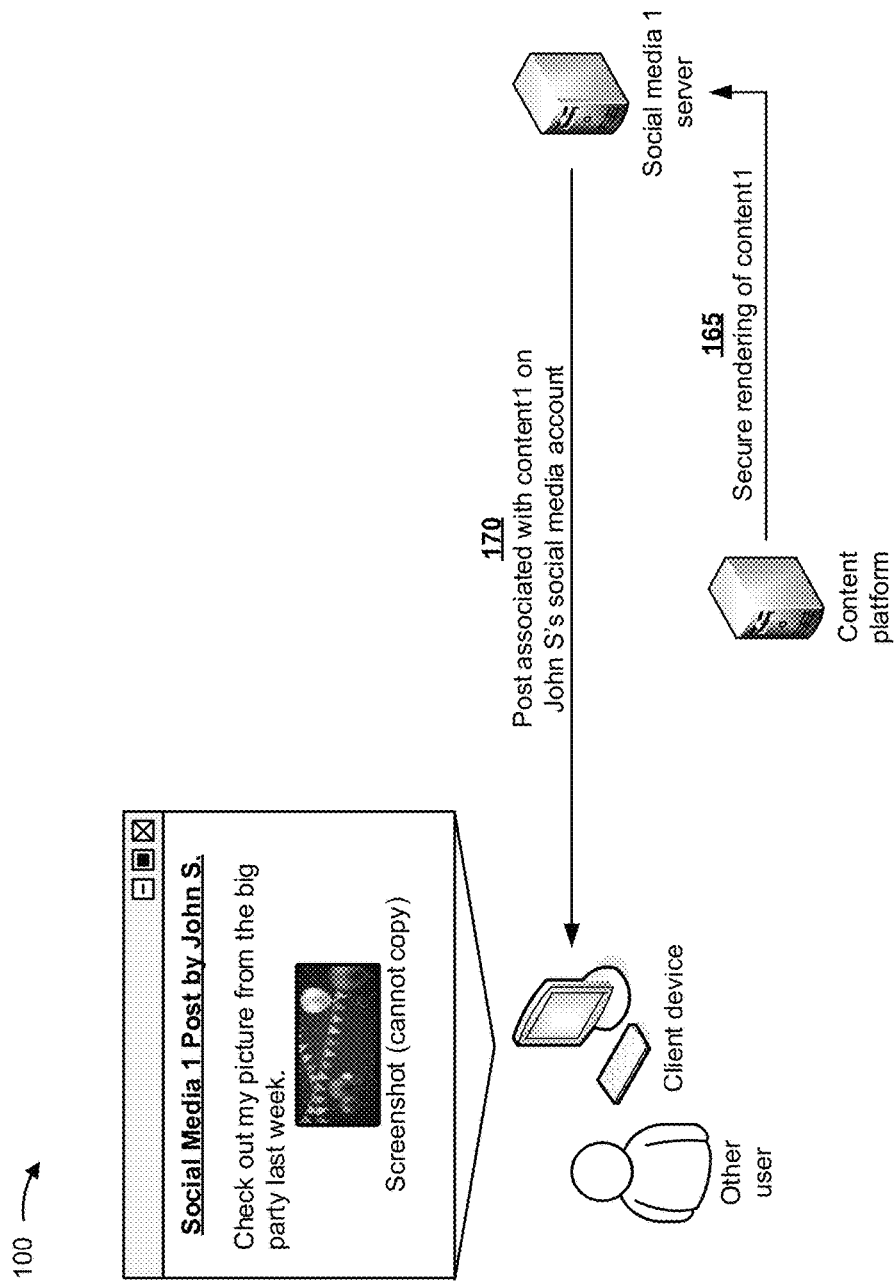

With reference to FIG. 1E, when the content platform receives the information indicating the content for the post, assume that instead of retrieving the link for the content, the content platform retrieves the rendering of the content from the data structure based on the search for the content, as described above. In such a scenario, as shown in FIG. 1E, and by reference number 165, the content platform may provide the rendering of the content (e.g., the screenshot of Content1) to the social media server, rather than the actual content. In some implementations, the social media server may generate the post for the user (e.g., John S.) based on the information submitted for the post by the user, and may provide the rendering of the content within the post.

As further shown in FIG. 1E, and by reference number 170, the social media server may publish the post associated with the content on the user's (e.g., John S.) social media account, and the post may be seen by the other user associated with the other client device. In some implementations, the social media server may publish the post, with the rendering of the content, on the user's social media account. For example, the social media server may publish the post via a user interface that indicates "Select the link to check out my picture from the big party last week" and the rendering of the content (e.g., the screenshot of Content1). In some implementations, the rendering of the content may be provided in the secure format so that the other user will be unable to copy the rendering, re-post the rendering, save the rendering, change the rendering, and/or the like.

Figure 1F:
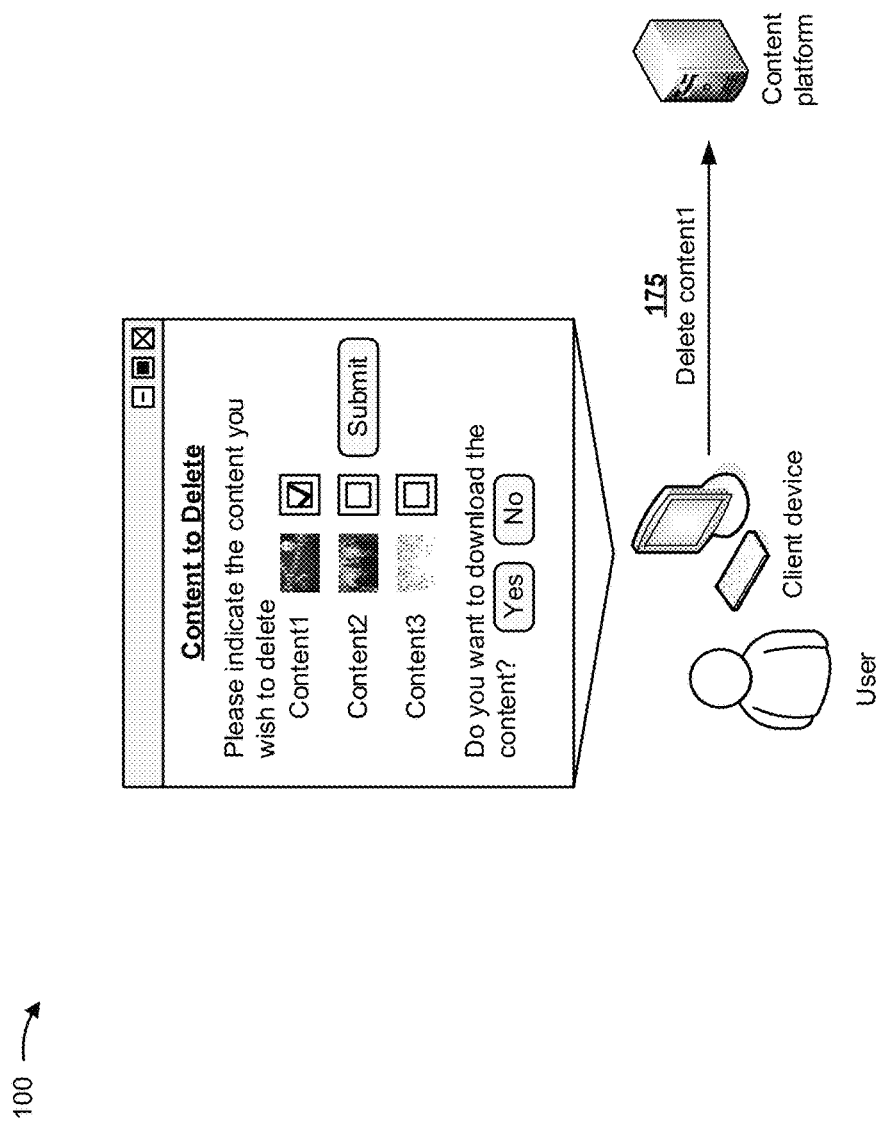

As shown in FIG. 1F, now assume that the user wishes to permanently delete content from the content platform, and that the content platform provides, to the client device, a user interface from which the user may select content to delete from the content platform. As shown, the user interface may provide a listing of the content (e.g., a name and a snippet of the content) stored by the content platform for the user, and the user may select content to delete from the listing of the content. The user interface may also provide the user with an option to download the content to be deleted (e.g., to the client device) before the content platform permanently deletes the content. As further shown in FIG. 1F, and by reference number 175, when the user selects the content to delete, the client device may provide, to the content platform, information indicating the content to delete and information indicating whether the content is to be downloaded to the client device before deletion. For example, assume that the user indicates that Content1 is to be permanently deleted.

In some implementations, if the user indicates that the content (e.g., Content1) is to be downloaded to the client device before deletion, the content platform may search the data structure for the content to be deleted (e.g., Content1), and may provide the content to be deleted to the client device based on the search. The client device may receive the content to be deleted and may store the content to be deleted on the client device.

In some implementations, the content platform may enable the user of the client device to view content, associated with the user, which is stored by the content platform. In such implementations, the user may select any of the content associated with the user, and may download the selected content for storage on the client device.

Figure 1G:
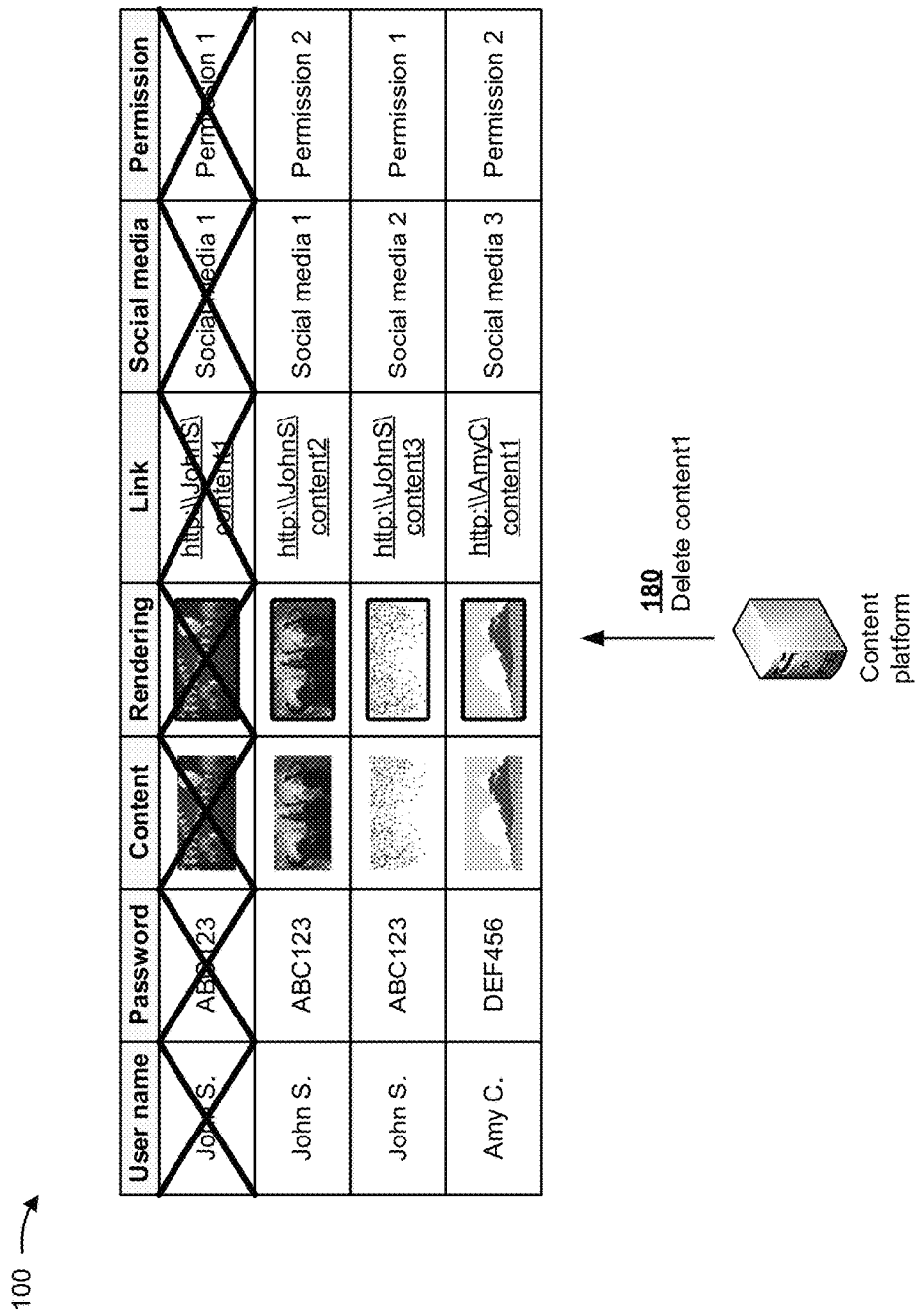

As shown in FIG. 1G, and by reference number 180, the content platform may search the data structure for the content to be deleted (e.g., Content1), and may locate the information associated with the content to be deleted (e.g., the user name, the password, the content, the rendering, the link, the social media applications granted access, the permissions, and/or the like) based on the search. The content platform may delete the content to be deleted and the information associated with the content to be deleted from the data structure.

Figure 1H:
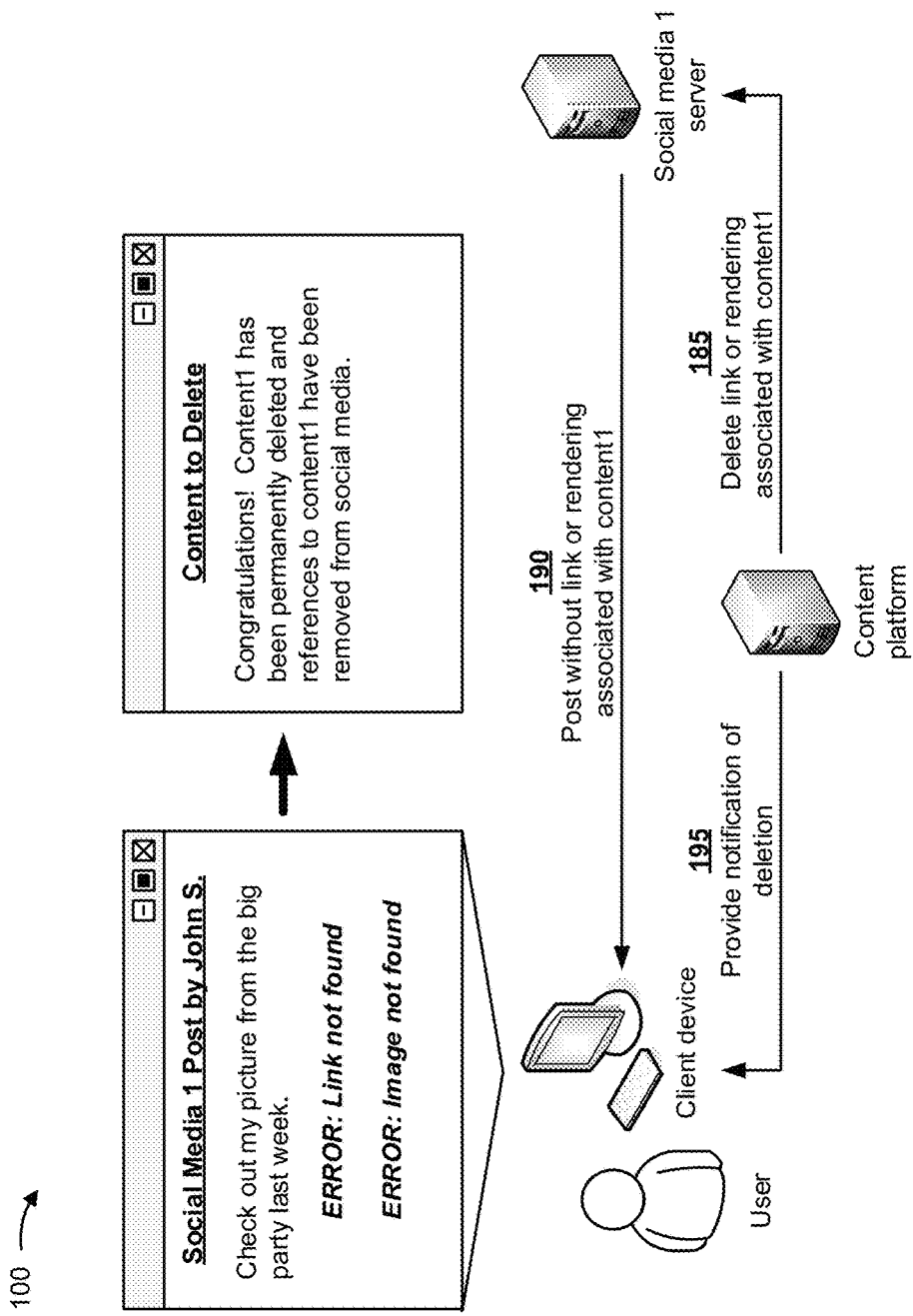

As shown in FIG. 1H, and by reference number 185, before, after, or while deleting the content from the data structure, the content platform may provide, to the social media server (e.g., social media 1 server), an instruction to delete the link and/or the rendering associated with the deleted content (e.g., Content1). The social media server may receive the instruction. In some implementations, the social media server may remove the link for the deleted content and/or the rendering of the deleted content from the post provided by the user on the social media application. As further shown in FIG. 1H, and by reference number 190, the social media server may provide, to the client device (or other client devices with access to the social media application), the post without the link for the deleted content and/or the rendering of the deleted content. The client device may display the post without the link and/or the rendering to the user. For example, the post may indicate that there is an error associated with the link (e.g., ERROR: Link not found) and/or an error associated with the rendering (e.g., ERROR: Image not found).

In some implementations, the social media server may completely remove the post associated with the deleted content rather than just removing the link for the deleted content and/or the rendering of the deleted content. As further shown in FIG. 1H, and by reference number 195, the content platform may provide, to the client device, a notification indicating that the content has been permanently deleted and that references to the content have been removed from the social media application. The client device may receive the notification, and may provide the notification for display to the user.

In some implementations, the user may customize the content plug-in application with permissions for social media applications. For example, a user may determine whether a social media application may receive the link for the content, whether a social media application may receive the rendering of the content, whether a social media application may receive both the link for the content and the rendering of the content, or may not receive either the link for the content and the rendering of the content.

In some implementations, the content platform may cause the content plug-in application to automatically determine permissions for social media applications based on a reputation of a particular social media application. For example, if the content platform determines that a social media application has a poor reputation, then the content platform may determine that the social media application may not receive either the link for the content or the rendering of the content. If the content platform determines that a social media application has a medium reputation, then the content platform may determine that the social media application may receive the link for the content but not the rendering of the content. If the content platform determines that a social media application has a good reputation, then the content platform may determine that the social media application may receive both the link for the content and the rendering of the content.

In some implementations, the user may customize the content plug-in application to select for which social media applications to use the content plug-in application. For example, the user may specify that the content plug-in is to be used with a first social media application, but is not to be used with a second social media application.

In some implementations, the user may customize the content plug-in application to select a particular security level for storing the information associated with the content. For example, the user may specify that the user credentials (e.g., username, password, and/or the like) have a high security level, that the content and the renderings of the content have a medium security level, and that social media names and permissions may have a low security level. In some implementations, the user may customize the content plug-in application to store the content with different security levels. For example, the user may specify that pictures of inanimate objects are to be stored with a low security level, and that pictures of people are to be stored with a high security level.

In this way, the content platform may securely store content and control usage of the content by social media applications, which may remove human subjectivity and waste from a content management process, and which may improve speed and efficiency of the content management process and conserve computing resources (e.g., processors, memory, and/or the like). Furthermore, implementations described herein use a computerized process to perform tasks or roles that were not previously performed or were previously performed using subjective human intuition or input. For example, users of social media applications had to manage their content, were unable to control dissemination of their content, and were unable to remove content shared with social media applications. Finally, securely storing content and controlling usage of the content by social media applications conserves computing resources (e.g., processors, memory, and/or the like) that would otherwise be wasted in unsuccessfully attempting to control content shared with social media application.

As indicated above, FIGS. 1A-1H are provided merely as examples. Other examples are possible and may differ from what was described with regard to FIGS. 1A-1H.

Figure 2:
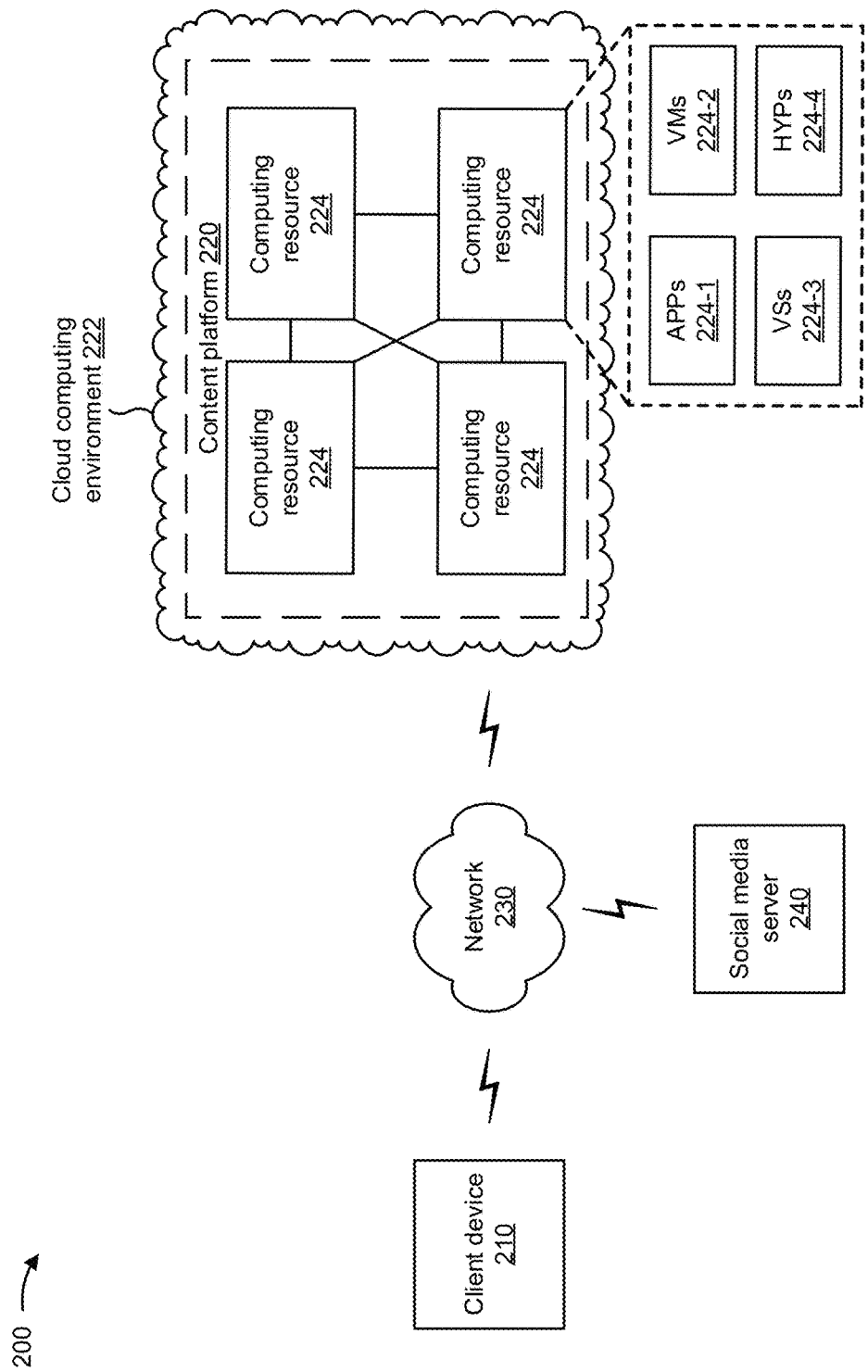
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a content platform 220, a network 230, and a social media server 240. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, client device 210 may receive information from and/or transmit information to content platform 220 and/or social media server 240.

Content platform 220 includes one or more devices that securely store content, associated with a user of client device 210, and control usage of the content by social media applications (e.g., provided by social media server 240). In some implementations, content platform 220 may be designed to be modular such that certain software components may be swapped in or out depending on a particular need. As such, content platform 220 may be easily and/or quickly reconfigured for different uses. In some implementations, content platform 220 may receive information from and/or transmit information to one or more client devices 210.

In some implementations, as shown, content platform 220 may be hosted in a cloud computing environment 222. Notably, while implementations described herein describe content platform 220 as being hosted in cloud computing environment 222, in some implementations, content platform 220 may not be cloud-based (i.e., may be implemented outside of a cloud computing environment) or may be partially cloud-based.

Cloud computing environment 222 includes an environment that hosts content platform 220. Cloud computing environment 222 may provide computation, software, data access, storage, etc. services that do not require end-user knowledge of a physical location and configuration of system(s) and/or device(s) that hosts content platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host content platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210 and/or social media server 240. Application 224-1 may eliminate a need to install and execute the software applications on client device 210 and/or social media server 240. For example, application 224-1 may include software associated with content platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of client device 210 and/or social media server 240, or an operator of content platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Social media server 240 includes one or more devices capable of receiving, generating, storing, processing, and/or providing information, such as information described herein. For example, social media server 240 may include a laptop computer, a tablet computer, a desktop computer, a server device, a group of server devices, or a similar type of device, that provides a social media application for access by client device 210. In some implementations, social media server may receive information from and/or transmit information to client device 210 and/or content platform 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
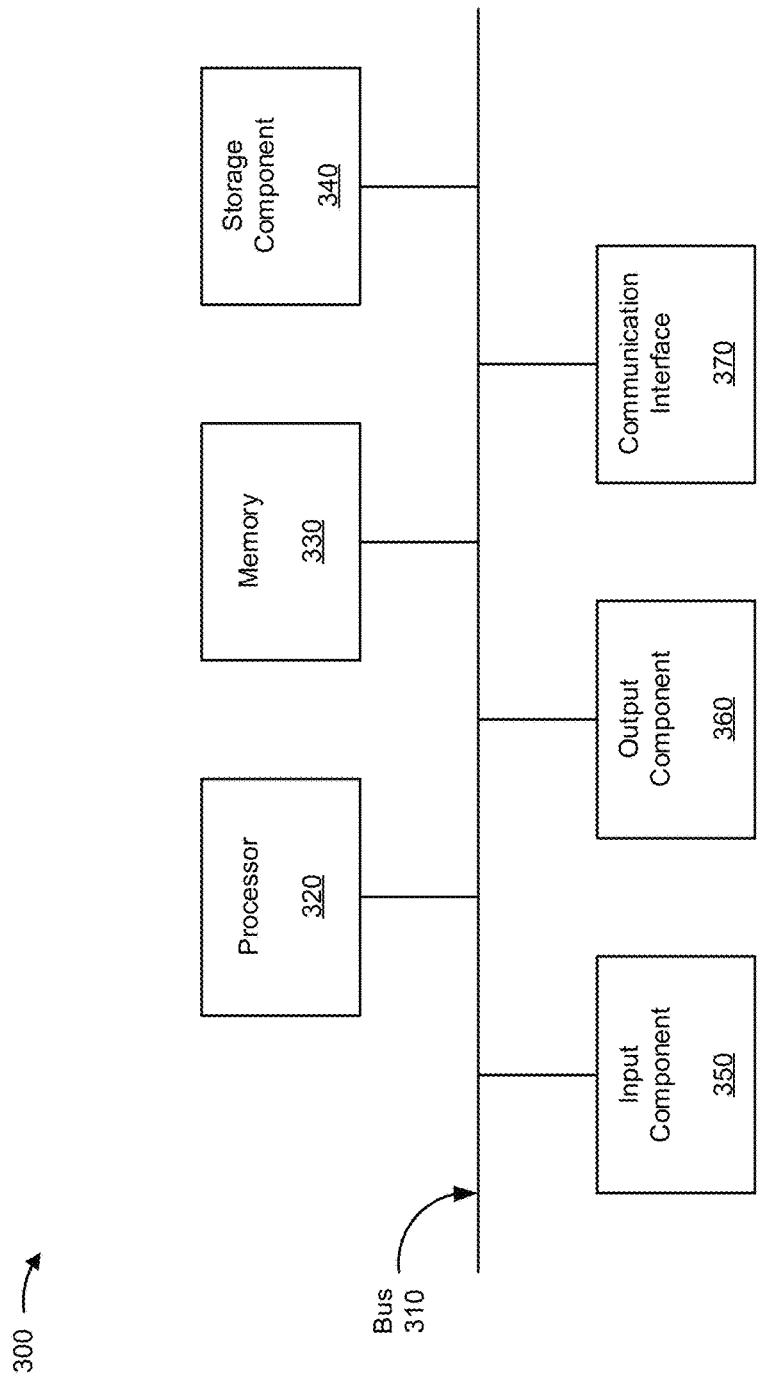
FIG. 3 is a diagram of example components of one or more devices of FIG. 2.

FIG. 3 is a diagram of example components of a device 300. Device 300 may correspond to client device 210, content platform 220, computing resource 224, and/or social media server 240. In some implementations, client device 210, content platform 220, computing resource 224, and/or social media server 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for securely storing content that may be utilized with social media applications. In some implementations, one or more process blocks of FIG. 4 may be performed by content platform 220. In some implementations, one or more process blocks of FIG. 4 may be performed by another device or a group of devices separate from or including content platform 220, such as client device 210 and/or social media server 240.

As shown in FIG. 4, process 400 may include providing a content plug-in application for installation on a client device (block 410). For example, content platform 220 may provide a content plug-in application for installation on client device 210. In some implementations, a user of client device 210 may wish to utilize client device 210 to download the content plug-in application provided by content platform 220. In some implementations, the content plug-in application may include an application that enables client device 210 to securely store content with content platform 220, and to control usage of the content by social media servers 240. In some implementations, the user may utilize client device 210 to download the content plug-in application from content platform 220, and to install and setup the content plug-in application. In some implementations, the content plug-in application may be pre-installed on client device 210.

In this way, content platform 220 may provide the content plug-in application for installation on client device 210.

As further shown in FIG. 4, process 400 may include receiving, based on installation of the content plug-in application, credentials and user customizations of a user of the client device and information indicating a social media application granted access to content (block 420). For example, content platform 220 may receive, based on installation of the content plug-in application by client device 210, credentials and user customizations of a user of client device 210 and information indicating a social media application granted access to content associated with the user. In some implementations, once client device 210 installs the content plug-in application, the user may utilize client device 210 to setup the content plug-in application. For example, the content plug-in application may request that the user identify to which social media applications to grant content access. The user may utilize client device 210 to indicate that the user wishes to grant content access to particular social media applications. In some implementations, client device 210 may provide, to social media servers 240, information indicating that the user granted content access to the particular social media applications. The information indicating that the user granted content access to the particular social media applications may be used by social media servers 240 to interact with content platform 220.

In some implementations, the content plug-in application may request that the user provide credentials (e.g., a user name and a password) for accessing content platform 220 and for granting permissions for content access to the social media applications. In some implementations, the user may cause client device 210 to provide, to content platform 220, the credentials and the information indicating that the user granted content access to the particular social media applications. Content platform 220 may receive the credentials and the information indicating that the user granted content access to the particular social media applications. In some implementations, the user may customize other aspects of the content plug-in application, such as permissions granted to social media applications, control over content, and/or the like.

In this way, content platform 220 receive, based on installation of the content plug-in application by client device 210, the credentials and the user customizations of the user of client device 210 and information indicating the social media application granted access to the content.

As further shown in FIG. 4, process 400 may include creating a user account for the user based on the credentials (block 430). For example, content platform 220 may create a user account for the user based on the credentials (e.g., the user name and the password). In some implementations, content platform 220 may store the user name and the password as authentication information for the user to access the user account with content platform 220. In some implementations, content platform 220 may utilize the authentication information in order to determine whether the user is authorized to access the content plug-in application. In some implementations, content platform 220 may utilize the user account to associate content, content controls, and/or the like with the user.

In this way, content platform 220 may create the user account for the user based on the credentials.

As further shown in FIG. 4, process 400 may include receiving content from the client device via the user account (block 440). For example, content platform 220 may receive content from client device 210 via the user account. In some implementations, the user may cause client device 210 to upload content to content platform 220 (e.g., via the user account for the user), and content platform 220 may receive the uploaded content from client device 210 and associate the uploaded content with the user account. In some implementations, content platform 220 may receive uploaded content from other users of content platform 220, and may associate the content with user accounts of the other users. In some implementations, the content uploaded by client device 210 and the content uploaded by the other users may include images, videos, text, audio files, and/or the like.

In some implementations, whenever the user of client device 210 performs an action indicating that the user is uploading content (e.g., to a social media site), the content plug-in application may automatically redirect client device 210 to content platform 220 so that the user may upload the content to content platform 220 instead of to the social media site (e.g., social media server 240).

In this way, content platform 220 may receive content from client device 210 via the user account.

As further shown in FIG. 4, process 400 may include generating a link for the content and/or a rendering of the content (block 450). For example, content platform 220 may generate a link for the content and/or a rendering of the content. In some implementations, content platform may 220 generate links for the content uploaded to content platform 220. In some implementations, the links may include information identifying locations of where the content is stored within content platform 220 (e.g., within a data structure associated with content platform 220). For example, if the user of client device 210 uploaded content, content platform 220 may generate a link identifying the location of where the content is stored within content platform 220.

In some implementations, content platform 220 may generate renderings for the content uploaded to content platform 220. In some implementations, content platform 220 may generate the renderings for the content by altering the content in various ways, such as by adjusting sizes, shapes, colors, shadings, formats, and/or the like of the content. In some implementations, the renderings may include screenshots (or screen captures) of the content uploaded to content platform 220. For example, if the user of client device 210 uploaded content, content platform 220 may generate a screenshot of the content is stored within content platform 220.

In some implementations, content platform 220 may securely store the content and/or the information associated with the content (e.g., the link for the content, the renderings of the content, and/or the like) by encrypting the information associated with the content, as described above in connection with FIG. 1B.

In this way, content platform 220 may generate the link for the content and/or the rendering of the content.

As further shown in FIG. 4, process 400 may include storing the credentials, the content, the link, the rendering, and the information indicating the social media application granted access to the content in a data structure (block 460). For example, content platform 220 may store the credentials, the content, the link, the rendering, and the information indicating the social media application granted access to the content in a data structure. In some implementations, content platform 220 may store information associated with the content in a data structure, such as a database, a table, a linked list, and/or the like associated with content platform 220. In some implementations, the information associated with the content may include a user name and a password associated with the user of client device 210 and content platform 220, the content uploaded to content platform 220, the renderings of the content, the links for the content, information indicating the social media applications granted access to the content, information indicating types of permissions granted to the social media applications (e.g., access to only the link, access to only the rendering, access to the link and the rendering, and/or the like), and/or the like.

In some implementations, content platform 220 may securely store the information associated with the content by encrypting the information associated with the content with an encryption technology. In some implementations, content platform 220 may only encrypt the content uploaded to content platform 220.

In this way, content platform 220 may store the credentials, the content, the link, the rendering, and the information indicating the social media application granted access to the content in the data structure.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for securely sharing stored content with a social media application. In some implementations, one or more process blocks of FIG. 5 may be performed by content platform 220. In some implementations, one or more process blocks of FIG. 5 may be performed by another device or a group of devices separate from or including content platform 220, such as client device 210 and/or social media server 240.

As shown in FIG. 5, process 500 may include receiving information indicating that the content is to be provided in a post associated with the social media application (block 510). For example, content platform 220 may receive information indicating that the content is to be provided in a post associated with the social media application. In some implementations, a user may utilize client device 210 to access a social media application, and the user may wish to post (e.g., share) content on the social media application. In some implementations, social media server 240 may provide, to client device 210, information for submitting content for the post, and client device 210 may display the information for submitting content for the post to the user. For example, client device 210 may display a user interface requesting the user to indicate the content the user wishes for the post, and the user may indicate the content for the post via the user interface. In some implementations, when the user indicates the content for the post, client device 210 may provide, to content platform 220, information indicating the content for the post. Content platform 220 may receive the information indicating the content for the post. In such implementations, client device 210 may receive the information indicating the content for the post (e.g., via a form that enables the user to submit the content), but client device 210 may not provide the content to social media server 240. Instead, client device 210 may be redirected to content platform 220, and may provide the content to content platform 220.

In some implementations, the content plug-in application may track keystrokes entered by the user via client device 210, and may determine whether the keystrokes indicate that the user is uploading content. If the keystrokes indicate that the user is uploading content, the content plug-in application may redirect client device 210 to content platform 220 so that the content may be provided to content platform 220.

In this way, content platform 220 may receive information indicating that the content is to be provided in the post associated with the social media application.

As further shown in FIG. 5, process 500 may include providing the link for the content and/or the rendering of the content to the post associated with the social media application based on receiving the information indicating that the content is to be provided to the post (block 520). For example, content platform 220 may provide the link for the content and/or the rendering of the content to the post associated with the social media application based on receiving the information indicating that the content is to be provided to the post. In some implementations, content platform 220 may search the data structure for the content for the post, and may retrieve the link for the content and/or the rendering of the content from the data structure based on the search for the content.

In some implementations, content platform 220 may provide the link for the content to social media server 240. In some implementations, social media server 220 may generate the post for the user based on the information submitted for the post by the user, and may provide the link for the content within the post. In some implementations, social media server 240 may publish the post associated with the content on the user's social media account, and the post may be seen by another user associated with another client device 210. In some implementations, social media server 240 may publish the post, with the link for the content, on the user's social media account.

In some implementations, when content platform 220 receives the information indicating the content for the post, instead of retrieving the link for the content, content platform 220 may retrieve the rendering of the content from the data structure based on the search for the content. In some implementations, content platform 220 may provide the rendering of the content to social media server 240. In some implementations, social media server 240 may generate the post for the user based on the information submitted for the post by the user, and may provide the rendering of the content within the post.

In some implementations, social media server 240 may publish the post associated with the content on the user's social media account, and the post may be seen by the other user associated with the other client device 210. In some implementations, social media server 240 may publish the post, with the rendering of the content, on the user's social media account. In some implementations, the rendering of the content may be provided in the secure format so that the other user will be unable to copy the rendering, re-post the rendering, save the rendering, change the rendering, and/or the like.

In this way, content platform 220 may provide the link for the content and/or the rendering of the content to the post associated with the social media application based on receiving the information indicating that the content is to be provided to the post.

As further shown in FIG. 5, process 500 may include receiving a selection of the link for the content from another client device associated with another user that is viewing the post via the social media application (block 530). For example, content platform 220 may receive a selection of the link for the content from another client device 210 associated with another user that is viewing the post via the social media application. In some implementations, if the other user utilizes the other client device 210 to select the link for the content, the other client device 210 may provide, to content platform 220, an indication of the selection of the link for the content. In some implementations, content platform 220 may receive the indication of the selection of the link for the content, and may search the data structure for the link. In such implementations, content platform 220 may locate the link in the data structure based on the search, and may identify the content associated with the link in the data structure.

In this way, content platform 220 may receive the selection of the link for the content from the other client device 210 associated with the other user that is viewing the post via the social media application.

As further shown in FIG. 5, process 500 may include providing the content, in a secure format, to the other client device based on the selection of the link (block 540). For example, content platform 220 may provide the content, in a secure format, to the other client device 210 based on the selection of the link. In some implementations, the secure format may include a format that prevents the other user from copying the content, re-posting the content, saving the content, changing the content, and/or the like. For example, the secure format may include a format that subjects the content to rights management, such as digital rights management access control technologies, information rights management access control technologies, and/or the like. In some implementations, the other client device 210 may receive the secure content, and may display the post with the secure content (e.g., rather than the link) to the other user. In some implementations, the other user will be unable to copy the secure content, re-post the secure content, save the secure content, change the secure content, and/or the like.

In this way, content platform 220 may provide the content, in the secure format, to the other client device 210 based on the selection of the link.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for deleting content that was previously shared with a social media application. In some implementations, one or more process blocks of FIG. 6 may be performed by content platform 220. In some implementations, one or more process blocks of FIG. 6 may be performed by another device or a group of devices separate from or including content platform 220, such as client device 210 and/or social media server 240.

As shown in FIG. 6, process 600 may include receiving information indicating that the content is to be deleted from the data structure (block 610). For example, content platform 220 may receive information indicating that the content is to be deleted from the data structure. In some implementations, a user of client device 210 may wish to permanently delete content from content platform 220, and the content plug-in application may provide a user interface from which the user may select content to delete from content platform 220. In some implementations, the user interface may provide a listing of the content stored by content platform 220 for the user, and the user may select content to delete from the listing of the content. The user interface may also provide the user with an option to download the content to be deleted (e.g., to client device 220) before content platform 220 permanently deletes the content. In some implementations, when the user selects the content to delete, client device 210 may provide, to content platform 220, information indicating the content to delete and information indicating whether the content is to be downloaded to client device 210 before deletion. Content platform 220 may receive the information indicating the content to delete and the information indicating whether the content is to be downloaded to client device 210.

In some implementations, if the user indicates that the content is to be downloaded to client device 210 before deletion, content platform 220 may search the data structure for the content to be deleted, and may provide the content to be deleted to client device 210 based on the search. Client device 210 may receive the content to be deleted and may store the content to be deleted on client device 210.

In this way, content platform 220 may receive the information indicating that the content is to be deleted from the data structure.

As further shown in FIG. 6, process 600 may include deleting the content from the data structure (block 620). For example, content platform 220 may delete the content from the data structure based on receiving the information indicating that the content is to be deleted from the data structure. In some implementations, content platform 220 may search the data structure for the content to be deleted, and may locate the information associated with the content to be deleted (e.g., the user name, the password, the content, the rendering, the link, the social media applications granted access, the permissions, and/or the like) based on the search. Content platform 220 may delete the content to be deleted and the information associated with the content to be deleted from the data structure.

In this way, content platform 220 may delete the content from the data structure based on receiving the information indicating that the content is to be deleted from the data structure.

As further shown in FIG. 6, process 600 may include providing information instructing a social media server, providing the social media application, to remove reference to the content in the post associated with the social media application (block 630). For example, content platform 220 may provide information instructing social media server 240, providing the social media application, to remove reference to the content in the post associated with the social media application. In some implementations, before, after, or while deleting the content from the data structure, content platform 220 may provide, to social media server 240, an instruction to delete the link and/or the rendering associated with the deleted content. Social media server 240 may receive the instruction. In some implementations, social media server 240 may remove the link for the deleted content and/or the rendering of the deleted content from the post provided by the user on the social media application. In some implementations, social media server 240 may provide, to client device 210 (or other client devices 210 with access to the social media application), the post without the link for the deleted content and/or the rendering of the deleted content. Client device 210 may display the post without the link and/or the rendering to the user. In some implementations, the social media server may completely remove the post associated with the deleted content rather than just removing the link for the deleted content and/or the rendering of the deleted content.

In this way, content platform 220 may provide the information instructing social media server 240, providing the social media application, to remove the reference to the content in the post associated with the social media application.

As further shown in FIG. 6, process 600 may include providing a notification indicating that the content has been deleted and the reference to the content has been removed from the social media application (block 640). For example, content platform 220 may provide a notification indicating that the content has been deleted and that the reference to the content has been removed from the social media application. In some implementations, content platform 240 may provide, to client device 210, a notification indicating that the content has been permanently deleted and that references to the content have been removed from the social media application (e.g., from social media server 240). Client device 210 may receive the notification, and may provide the notification for display to the user. In some implementations, content platform 220, prior to providing the notification, may request confirmation, from social media server 240, that that references to the content have been removed from the social media application. In such implementations, content platform 220 may request not only confirmation from social media server 240, but also information providing proof that social media server 240 removed references to the content from the social media application.

In this way, content platform 220 may provide the notification indicating that the content has been deleted and that the reference to the content has been removed from the social media application.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Some implementations described herein may provide a content platform that securely stores content and controls usage of the content by social media applications. For example, the content platform may enable a user to store content in storage associated with the content platform, instead of directly sharing the content with a social media application. The content platform may generate a link to the content in the storage, and may generate a rendering of the content that simulates the content. If the user wishes to share the content via a post on a social media application, the content platform may provide the link and/or the rendering to the post on the social media application, instead of the content (e.g., so that content may not be copied). Thus, the content platform may securely store the content and may control usage of the content by the social media application. Finally, if the user wishes to delete the content, the content platform may delete the content from the storage, and may cause the social media application to remove the link and/or the rendering from the post on the social media application.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
provide a content application for installation on a client device;
receive, based on installation of the content application on the client device:
credentials of a user of the client device, and
information identifying a social media application granted access to content associated with the user;
create a user account for the user based on the credentials of the user;
receive the content from the client device and via the user account;
generate a link for the content;
store the credentials, the content, the link, and the information identifying the social media application in the one or more memories;
receive information indicating that the content is be provided in a post associated with the social media application;
provide the link for the content to the post associated with the social media application;
receive a selection of the link for the content from another client device associated with another user that is viewing the post via the social media application;
provide the content, in a secure format, to the other client device based on the selection of the link; and
receive, from the client device, information indicating that the content is to be deleted;
delete the content from the one or more memories;
instruct a social media server device, providing the social media application, to remove the link from the post associated with the social media application; and
provide, to the client device, a notification indicating that the content has been deleted and that the link has been removed from the social media application.

2. The device of claim 1, where the one or more processors are further to:
generate a rendering of the content; and
provide the rendering of the content to the post associated with the social media application.

3. The device of claim 2, where the rendering of the content includes a screenshot of the content.

4. The device of claim 1, where the one or more processors are further to:
provide, to the client device, an option to download the content to the client device prior to deleting the content from the one or more memories;
receive, from the client device, a request to download the content based on the option; and
provide the content to the client device based on the request to download the content and prior to deleting the content from the one or more memories.

5. The device of claim 1, where the one or more processors are further to:
receive, based on installation of the content application on the client device, user customization information for the content application,
the user customization information including information indicating whether the social media application is to receive the link for the content or a rendering of the content.

6. The device of claim 1, where the link includes a metadata tag identifying the content.

7. A method, comprising:
receiving, by a device, content from a client device associated with a user,
a social media application being granted access to the content based on a permission of the user;
generating, by the device, a link for the content;
storing, by the device, the content, the link, and information identifying the social media application in a data structure;
receiving, by the device, information indicating that the content is be provided in a post associated with the social media application;
providing, by the device, the link for the content to a social media server device associated with the social media application,
the social media server device to provide the link in the post associated with the social media application;

receiving, by the device, a selection of the link for the content from another client device associated with another user that is viewing the post via the social media application; and
providing, by the device, the content, in a secure format, to the other client device based on the selection of the link;
receiving, by the device and from the client device, information indicating that the content is to be deleted;
deleting, by the device, the content from the data structure;
instructing, by the device, the social media server device to remove the link from the post associated with the social media application; and
providing, by the device and to the client device, a notification indicating that the content has been deleted and that the link has been removed from the social media application.

8. The method of claim 7, further comprising:
providing a content application for installation on the client device;
receiving, based on installation of the content application on the client device:
credentials of the user of the client device, and
the information identifying the social media application;
creating a user account for the user based on the credentials of the user; and
storing the credentials in the data structure.

9. The method of claim 7, further comprising:
generating a rendering of the content; and
providing the rendering of the content to the social media server device,
the social media server device to provide the rendering in the post associated with the social media application.

10. The method of claim 9, where the rendering of the content includes a screenshot of the content.

11. The method of claim 7, further comprising:
providing, to the client device, an option to download the content to the client device prior to deleting the content from the data structure;
receiving, from the client device, a request to download the content based on the option; and
providing the content to the client device based on the request to download the content and prior to deleting the content from the data structure.

12. The method of claim 7, where the link includes a metadata tag identifying the content.

13. A non-transitory computer-readable medium storing instructions, the instructions comprising:
one or more instructions that, when executed by one or more processors of a device, cause the one or more processors to:
provide a content application for installation on a client device;
receive, based on installation of the content application on the client device, information identifying a social media application granted access to content associated with the client device;
receive the content from the client device;
generate one of a link for the content or a rendering of the content;
store the content, the link or the rendering, and the information identifying the social media application in a data structure;
receive information indicating that the content is be provided in a post associated with the social media application;
provide the one of the link for the content or the rendering of the content to the post associated with the social media application;
receive, when the link is provided to the post, a selection of the link for the content from another client device that is displaying the post via the social media application; and
provide the content, in a secure format, to the other client device based on the selection of the link;
receive, from the client device, information indicating that the content is to be deleted;
delete the content from the data structure;
instruct a social media server device, providing the social media application, to remove the one of the link or the rendering from the post associated with the social media application; and
provide, to the client device, a notification indicating that the content has been deleted and that the one of the link or the rendering has been removed from the social media application.

14. The non-transitory computer-readable medium of claim 13, where the instructions further comprise:
one or more instructions that, when executed by the one or more processors, cause the one or more processors to:
provide, to the client device, information indicating whether the content is to be provided to the client device before being deleted;
receive, from the client device and based on the information indicating whether the content is to be provided to the client device, a request for the content; and
provide the content to the client device based on the request for the content and prior to deleting the content from the data structure.

15. The non-transitory computer-readable medium of claim 13, where the link includes a metadata tag identifying the content.

16. The non-transitory computer-readable medium of claim 13, where the rendering of the content includes a screenshot of the content.

17. The non-transitory computer-readable medium of claim 13, where the instructions further comprise:
one or more instructions that, when executed by the one or more processors, cause the one or more processors to:
receive, based on installation of the content application on the client device, credentials of a user of the client device;
create a user account for the user based on the credentials of the user; and
store the credentials in the data structure.

18. The device of claim 1, where the link includes information identifying where the content is stored.

19. The method of claim 7, where the link includes information identifying where the content is stored.

20. The non-transitory computer-readable medium of claim 13, where the link includes information identifying where the content is stored.

* * * * *